W. T. JAHNE & A. MOORS.
FISHING-LINE LEADER.
No. 186,134.  Patented Jan. 9, 1877.
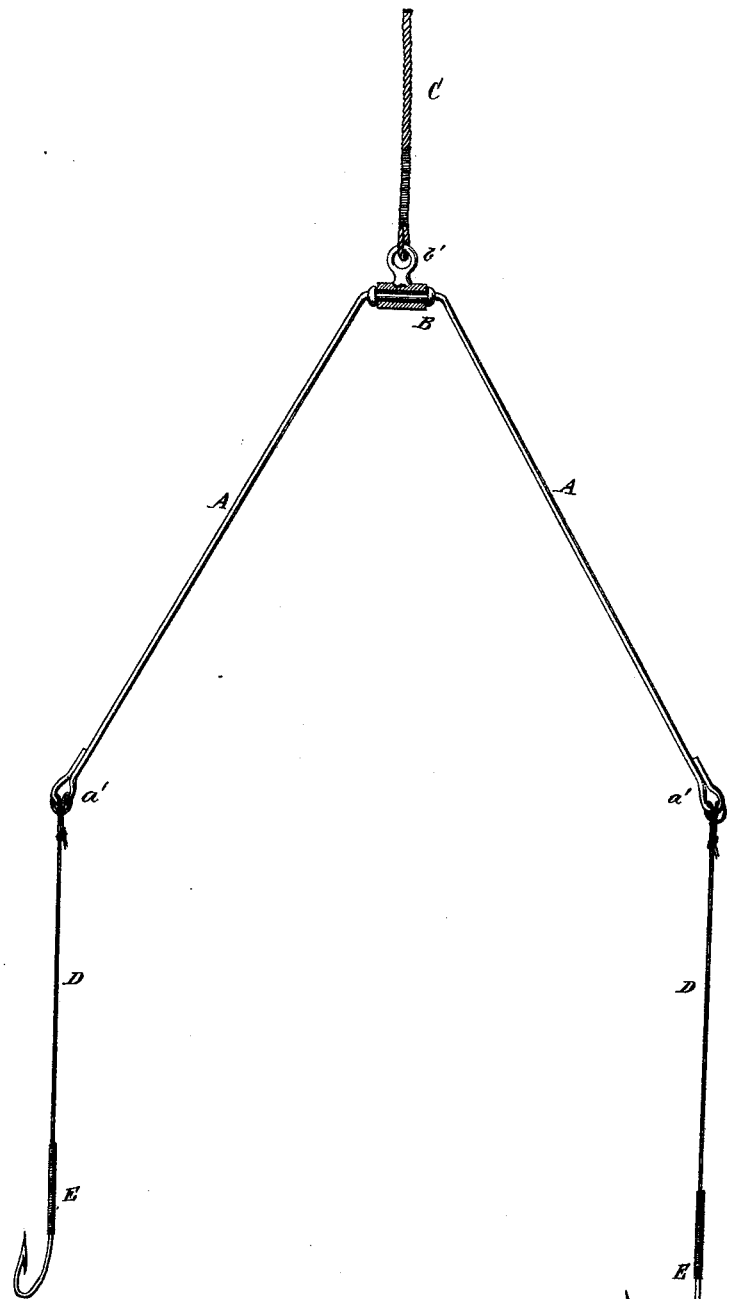

UNITED STATES PATENT OFFICE

WELMER T. JAHNE AND ANTHONY MOORS, OF JERSEY CITY, NEW JERSEY.

IMPROVEMENT IN FISHING-LINE LEADERS.

Specification forming part of Letters Patent No. 186,134, dated January 9, 1877; application filed May 26, 1876.

*To all whom it may concern:*

Be it known that we, WELMER T. JAHNE and ANTHONY MOORS, of Jersey City, in the county of Hudson and State of New Jersey, have invented a new and useful Improvement in Fishing-Line Leaders, of which the following is a specification:

The figure represents our improved leader as attached to a line, and having the snells attached to it.

The object of this invention is to furnish an improved device for connecting the gut-snells with the line in such a way that the hooks will be kept apart however the line be thrown, and will prevent the hooks from becoming entangled with the line however they may be swept about by the current.

The invention consists in the leader, made of spring-wire, bent into V form, provided with a swivel and eye at its middle part, and with eyes or loops at its ends to receive the line and snells, as hereinafter fully described.

A represents the leader, which is made of spring-wire, bent into V shape, and having a swivel, B, attached to it at its center or angle. The swivel B is provided with an eye $b'$, to which the line C is attached. Upon the ends of the leader A are formed loops or eyes $a'$, to which the ends of the gut-snells D are attached. To the outer ends of the snells D are attached the hooks E, in the usual way.

By this construction the snells and hooks will be kept apart, however the line may be thrown, and however they and the leader may be turned about by the tide or current.

Having thus described our invention, we claim as new and desire to secure by Letters Patent—

The fishing-line leader, herein described, consisting of the V-shaped spring-frame A and the horizontal swivel $b'$, having an eye, B, thereon, fitted to the spring-frame at the bend thereof, as and for the purpose set forth.

WELMER T. JAHNE.
ANTHONY MOORS.

Witnesses:
JAMES T. GRAHAM,
T. B. MOSHER.